(12) United States Patent
Hong et al.

(10) Patent No.: US 8,151,250 B2
(45) Date of Patent: Apr. 3, 2012

(54) PROGRAM TRACE METHOD USING A RELATIONAL DATABASE

(75) Inventors: Sung-Pack Hong, Suwon-si (KR); Sung-Joo Yoo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1108 days.

(21) Appl. No.: 12/009,786

(22) Filed: Jan. 22, 2008

(65) Prior Publication Data
US 2008/0178158 A1 Jul. 24, 2008

(30) Foreign Application Priority Data
Jan. 22, 2007 (KR) ........................ 10-2007-0006640

(51) Int. Cl.
G06F 9/44 (2006.01)
(52) U.S. Cl. .................. 717/128; 717/124; 717/127
(58) Field of Classification Search ........... 717/124–135
See application file for complete search history.

(56) References Cited

U.S. PATENT DOCUMENTS

| | | | | |
|---|---|---|---|---|
| 5,058,114 | A | | 10/1991 | Kuboki et al. |
| 5,819,094 | A | * | 10/1998 | Sato et al. ............. 717/131 |
| 5,898,873 | A | * | 4/1999 | Lehr ................... 717/125 |
| 6,126,329 | A | * | 10/2000 | Bennett et al. ........... 717/127 |
| 6,154,857 | A | | 11/2000 | Mann |
| 6,513,155 | B1 | * | 1/2003 | Alexander et al. ........ 717/124 |
| 6,553,564 | B1 | * | 4/2003 | Alexander et al. ........ 717/128 |
| 6,598,012 | B1 | * | 7/2003 | Berry et al. ............. 702/187 |
| 6,934,935 | B1 | * | 8/2005 | Bennett et al. ........... 717/127 |
| 7,120,901 | B2 | * | 10/2006 | Ferri et al. .............. 717/128 |
| 7,979,850 | B2 | * | 7/2011 | Ivanov et al. ............ 717/128 |
| 8,028,200 | B2 | * | 9/2011 | Ivanov et al. ............ 717/128 |
| 2004/0117768 | A1 | * | 6/2004 | Chang et al. ............ 717/125 |
| 2006/0117299 | A1 | * | 6/2006 | Goldsmith et al. ........ 717/124 |
| 2008/0127110 | A1 | * | 5/2008 | Ivanov et al. ............ 717/128 |
| 2008/0155348 | A1 | * | 6/2008 | Ivanov et al. ............. 714/45 |
| 2008/0163177 | A1 | * | 7/2008 | Ivanova ................ 717/128 |
| 2008/0163178 | A1 | * | 7/2008 | Ivanova ................ 717/128 |

FOREIGN PATENT DOCUMENTS

| | | |
|---|---|---|
| KR | 1999-0070329 | 9/1999 |
| KR | 2001-0006194 | 1/2001 |
| KR | 2003-0056232 | 7/2003 |
| WO | WO 98/45784 | 10/1998 |

OTHER PUBLICATIONS

Osier, Jeffrey, "GNU gprof," 1988, Free Software Foundation, Inc., p. 1-12.*
The GNU Operating system, www.gnu.org, printed Dec. 11, 2007.
GNU gprof, www.cs.utah.edu/dept/old/textinfo/as/gprof.html, edited Jan. 1993.
Acorn RISC Machine: ARM Holdings, Inc., www.arm.com, updated Dec. 13, 2007.

\* cited by examiner

Primary Examiner — Anna Deng
Assistant Examiner — Qing Chen
(74) Attorney, Agent, or Firm — Onello & Mello, LLP

(57) ABSTRACT

Disclosed is a method of tracing a program that comprises: providing a relational database data structure defining a plurality of fields configured to store program trace information; executing a program comprising a plurality of functions including calling a function from the program; extracting first trace data of the function and storing the first trace data in a portion of the plurality of fields; and after executing the program, extracting second trace data associated with the first trace data and storing the second trace data in remaining portions of the plurality of fields.

18 Claims, 9 Drawing Sheets

| 10 | 20 | 30 | 40 | 50 | 60 | 70 | 80 |
|---|---|---|---|---|---|---|---|
| Activity ID | Function ID | Start Time | Continuation Time | First Child Function Activity ID | First Sibling Function Activity ID | Next Activity ID | Parent Function Activity ID |
| 1 | Main | 0 | 85 | 2 | - | - | - |
| 2 | A | 5 | 35 | 3 | 5 | - | 1 |
| 3 | B | 10 | 10 | - | 4 | 6 | 2 |
| 4 | C | 25 | 10 | - | - | - | 2 |
| 5 | D | 45 | 35 | 6 | - | - | 1 |
| 6 | B | 50 | 10 | - | 7 | - | 5 |
| 7 | E | 65 | 10 | - | - | - | 5 |

Fig. 3

| Activity ID | Function ID | Start Time | Continuation Time | First Child Function Activity ID | First Sibling Function Activity ID | Next Activity ID | Parent Function Activity ID |
|---|---|---|---|---|---|---|---|
| 10 | 20 | 30 | 40 | 50 | 60 | 70 | 80 |

Fig. 4A

```
Main() {
        A();
        D();
}
A() {
        B();
        C();
}
D() {
        B();
        E();
}
```

| Activity ID | Function ID | Start Time | Continuation Time | First Child Function Activity ID | First Sibling Function Activity ID | Next Activity ID | Parent Function Activity ID |
|---|---|---|---|---|---|---|---|
| 1 | Main | 0 | 85 | 2 | - | - | - |
| 2 | A | 5 | 35 | 3 | 5 | - | 1 |
| 3 | B | 10 | 10 | - | 4 | - | 2 |
| 4 | C | 25 | 10 | - | - | 6 | 2 |
| 5 | D | 45 | 35 | 6 | - | - | 1 |
| 6 | B | 50 | 10 | - | 7 | - | 5 |
| 7 | E | 65 | 10 | - | - | - | 5 |

```
>calltrace_fn -act 10 -depth 4 HTaskRd
Function:[HTaskRd] Activation: <10>
   1377755993    1377756160  (    167>   < [-:-:-:-:-:-]
   1377756160    1377756653  (    493>   + [ChCheckResource4RdI] (10)
   1377756653    1377757753  (   1100>     [-:-:-:-:-:-]
   1377757753    1377759033  (   1200>   < [ChHostOpen4RdI] (10)
   1377759033    1377759146  (    113>     < [ChCmdAnalyze] (10)
   1377759146    1377761973  (   2827>       + [ChUpdateLRU] (10)
   1377761973    1377764326  (   2353>     > [ChCmdAnalyze] (10)
   1377764326    1377765626  (   1300>   - [ChHostOpen4RdI] (10)
   1377765626    1377766226  (    600>     + [ChInitSeg] (537>
   1377766226    1377767553  (   1327>   - [ChHostOpen4RdI] (10)
   1377767553    1377767880  (    327>   < [ChHostGather4Rd] (183)
   1377767880    1377768133  (    253>     < [ChFindCSegLT] (128)
   1377768133    1377770940  (   2807>       + [ChFindCSegLTIm] (128)
   1377770940    1377770940  (      0>     > [ChFindCSegLT] (128)
   1377770940    1377771446  (    506>   > [ChHostGather4Rd] (183)
   1377771446    1377771906  (    460>   - [ChHostOpen4RdI] (10)
```

Start Time    End Time    Execution Time    Child and Parent Functions

```
trace_path -act 516 ATInt ReadOpenHost
Path = [ATInt] <516> ~ [ReadOpenHost] <4>
132335126   132336540   (   1414)               [ATInt](516)
132336540   132338293   (   1753)                 [IRQInt](517)
132338293   132339080   (    787)               [HTaskBegin](516)
132339080   132339320   (    240)                 [HTaskEnd](515)
132339320   132339573   (    253)               [ReportErrD2HFIS](515)
132339573   132339840   (    267)                 [HTaskErrDXferDone](48)
132339840   132358726   (  18886)             [MainLoop](1100)
132358726   132358800   (     74)               [GoWaitCmdLoop](0)
132358800   132389206   (  30406)             [MainLoop](1101)
132389206   132389280   (     74)               [GoWaitCmdLoop](0)
132389280   132389653   (    373)             [MainLoop](1102)
132389653   132389800   (    147)               [CmdRdDma](2)
132389800   132410706   (  20906)                 [HTaskRd](2)
132410706   132418120   (   7414)                   [ReadOpenHost](4)
```

⇨ Start Time    ⇨ End Time    ⇨ Execution Time    ⇨ Child and Parent Functions

PROGRAM TRACE METHOD USING A RELATIONAL DATABASE

CROSS-REFERENCE TO RELATED APPLICATIONS

This U.S. non-provisional patent application claims priority under 35 U.S.C. §119 to Korean Patent Application No. 10-2007-0006640 filed on Jan. 22, 2007, the entire contents of which are hereby incorporated by reference.

BACKGROUND

The present invention disclosed herein relates to a program trace and more particularly, to a method of tracing a program for solving the bottleneck phenomenon that affects program performance.

Conventional software trace and profilers do not provide a satisfactory function of optimizing software. As used herein, a trace analyzes relational information of a function that is executed by a program in order to solve the bottleneck phenomenon with respect to the function during execution of a program. The profiling is listing characteristics of a program based on trace data that is collected to execute a program trace. For example, the program profiling can include generating a listing including a maximum execution time of a program, a function name having the longest execution time in a program, and the like.

In general, gprof of GNU (GNU stands for "GNU's Not Unix") is used for the program profiling. The gprof of GNU can provide overall profile information such as the execution time of respective functions executed by a program, the execution weight of a child function of the respective functions, a function call number, and the like.

Further, a program of showing a program trace using simulation can include SocDesigner of ARM (Acorn RISC Machine: ARM Holdings, Inc.). The SocDesigner of ARM can provide profile information in a similar level to the gprof of GNU.

Meanwhile, ETM (Embedded Trace Macrocell) of ARM extracts instructions really executed at the hardware level and reproduces execution of a program using the extracted instructions. But the ETM of ARM does not support the trace browsing of a function call unit, and provides profile information in a lower level than that of the gprof of GNU.

In order to optimize program performance more effectively, there can be required function of browsing a call trace of a program execution function, displaying information related to program execution activation history and profiling, displaying information related to the history and profiling of a program path, providing information related to a parent function of a program execution function, and the like. CallStack means information related to the order of functions that are called while a program is executed.

SUMMARY OF THE INVENTION

In accordance with the present invention, there is provided a program tracing and profiling method using a relational database.

One aspect of the present invention is to provide a method of tracing a program that comprises providing a relational database data structure defining a plurality of fields configured to store program trace information; executing a program comprising a plurality of functions including calling a function from the program; extracting first trace data of the function and storing the first trace data in a portion of the plurality of fields; and after the executing the program, extracting second trace data associated with the function using the first trace data and storing the second trace data in remaining portions of the plurality of fields.

The first trace data can comprise a name, a start time, and an end time associated with the called function.

The plurality of fields of the relational database can comprise an activity ID and a set of information related to the activity ID including a function ID, a start time, a continuation time, a first child function activity ID, a first sibling function activity ID, a next activity ID, and a parent function activity ID.

The second trace data can comprise the first sibling function activity ID and the next activity ID.

The remaining portions of the plurality of fields can comprise the first sibling function activity ID and the next activity ID.

The method can further comprise designating the called function in the activity ID; and outputting start, end, and continuation times associated with the activity ID and start, end and continuation times of a child function that the function indicated by the activity ID calls.

The method can further comprise recursively displaying information of child functions associated with the activity ID up to a predetermined depth.

The depth indicates calls and returns between the called function and child functions.

The method can further comprise: tracing activity of the called function as a function to be browsed using one or more of: a previous activity of the function to be browsed, a next activity of the function to be browsed, an activity of a parent function of the function to be browsed, an activity of an Nth child function of the function to be browsed, an activity of the function to be browsed that a parent function of the function to be browsed calls prior to the function, and an activity of the function to be browsed that a parent function of the function to be browsed calls next after the function.

The method can further comprise: designating a program path by providing at least one of a start function ID and an end function ID of the program path, a function ID that the program path passes, and a function ID that no program path passes; and displaying a start time, an end time, and a continuation time of function IDs corresponding to the program path.

The program path can comprise path functions between the start function and the end function indicated by the start function ID and the end function ID, respectively.

The path functions can comprise a first function called by the start function, a (N−1)th function called by the first function, and an Nth function called from the (N−1)th function.

The method can further comprise recursively displaying functions corresponding to the program path up to a predetermined depth.

The depth can indicate calls and returns between the functions.

The method can further comprise providing at least one of a previous activity and a next activity of the program path to trace activity of the program path.

The method can further comprise establishing at least one trace parameter corresponding to at least one of: an activation number range of the activity ID, a time range of the activity ID, an activity included in a program path, an activity having a specific function as a descendant function, and an activity having a specific function as an ancestor function; and outputting activation start, end and continuation times of the activity ID and activation history information of a parent function of the activity ID based on the established at least one trace parameter. The descendant function can be a function that a child function calls and the ancestor function is a function that a parent function calls.

The method can further comprise establishing at least one program path trace parameter including: an activity number range of a specific function, and a specific time interval; and outputting activation start, end and continuation times of the program path according to the at least one trace parameter.

The method can further comprise outputting a call number and an execution time of each parent function associated with the activity ID.

The method can further comprise designating a time and an activity ID for generating a CallStack and outputting the CallStack.

The CallStack can be a call order of the activity ID.

BRIEF DESCRIPTION OF THE FIGURES

Non-limiting and non-exhaustive embodiments in accordance with aspects of the present invention will be described with reference to the following figures, wherein like reference numerals refer to like parts throughout the various figures unless otherwise specified. In the figures:

FIG. 3 is a block diagram showing an embodiment of a relational database data structure comprising a plurality of fields according to aspects of the present invention.

FIG. 4A shows an exemplary program.

FIG. 4C is a table showing the call relationships of functions in FIG. 4B that are stored using the relational database.

DETAILED DESCRIPTION OF PREFERRED EMBODIMENTS

Figure 1:
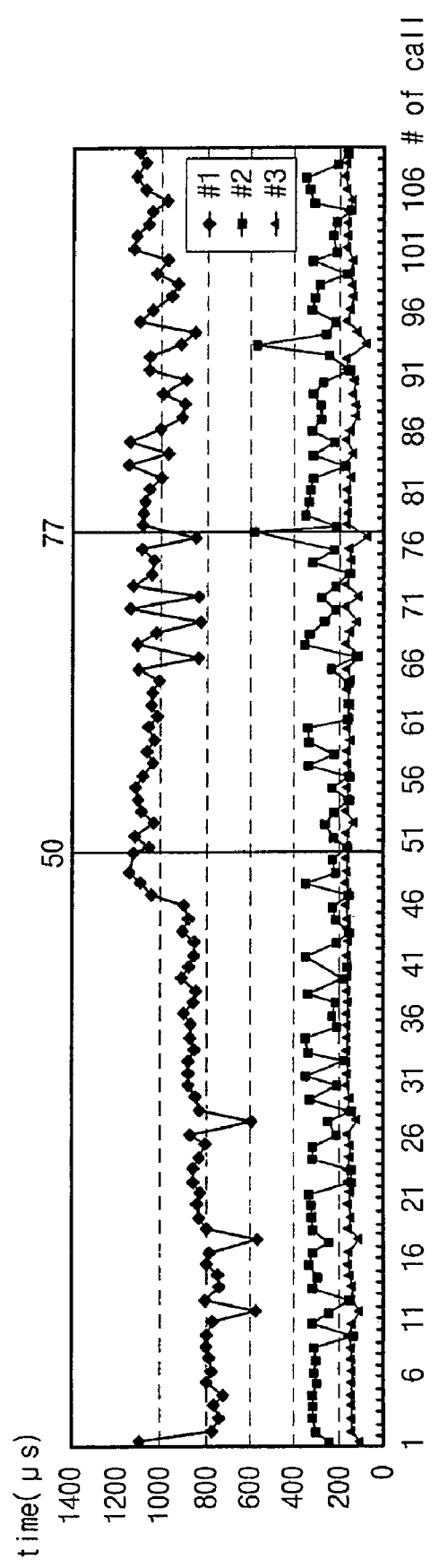
FIG. 1 is a graph showing variation of execution time of a first function #1, a second function #2, and a third function #3 that are executed in a program.

Preferred embodiments in accordance with aspects of the present invention will be described below in more detail with reference to the accompanying drawings, showing a flash memory device as an example for illustrating structural and operational features by the invention. The present invention can, however, be embodied in different forms and should not be construed as limited to the embodiments set forth herein. Like reference numerals refer to like elements throughout the accompanying figures.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

FIG. 1 is a graph showing variations in execution times of a first function #1, a second function #2, and a third function #3 that are executed in a program.

Referring to FIG. 1, a conventional trace program does not provide history information that is illustrated in FIG. 1. For example, a first function #1 can require an execution time that is increased as compared with the execution time of the same function after the $50^{th}$ execution. It is necessary to analyze the reason for this increase because the increase could indicate a cause of a program bottleneck. But, no conventional trace program provides information for analyzing such a cause.

Further, $77^{th}$ activity of a second function #2 requires an execution time longer than those of other activities of function #2. Accordingly, it is necessary to browse (or analyze) the $77^{th}$ activity of the second function #2 in detail in order to attempt to determine the cause of the variation.

Figure 2:
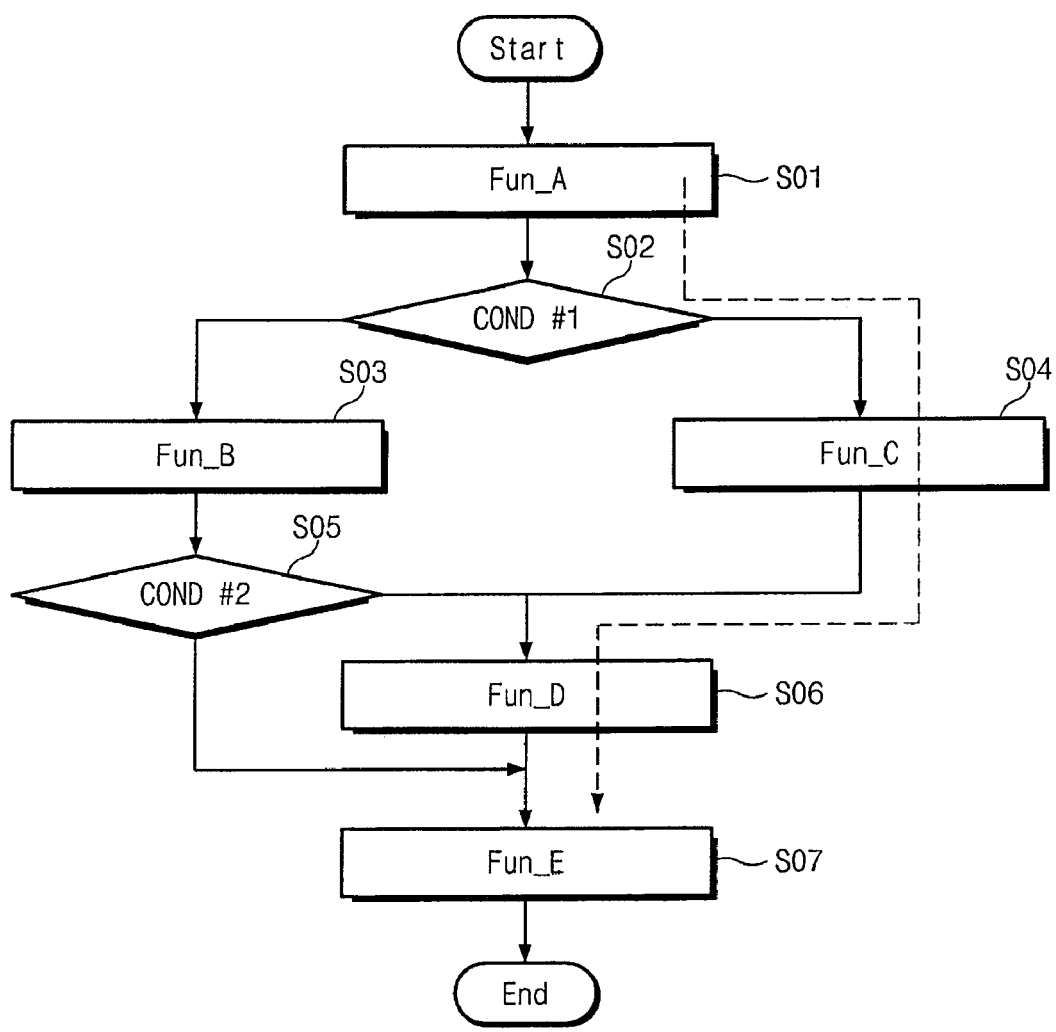
FIG. 2 is a flow diagram showing an embodiment of an execution path of first to fourth functions Fun_A, Fun_B, Fun_C, Fun_D, and Fun_E that are executed in a program.

FIG. 2 is a flow diagram showing an execution path of first to fourth functions Fun_A, Fun_B, Fun_C, Fun_D, and Fun_E that are executed in a program, which could be any type of computer program.

Referring to FIG. 2, the program can execute a first function Fun_A in step S01. In step S02, the procedure goes to step S03 (Fun_B) or S04 (Fun_C) according to a first condition COND #1. In step S05, the procedure goes to step 06 (Fun_D) or 07 (Fun_E) according to a second condition COND #2.

If a first function Fun_A, a second function Fun_B, a fourth function Fun_D, and a fifth Fun_E are executed according to the first and second conditions COND #1 and COND#2, a conventional trace program does not provide history and summarized profile information with respect to a path that consists of the first function Fun_A, third function Fun_C, fourth function Fun_D, and fifth function Fun_E, as is marked by a dotted line in FIG. 2.

Furthermore, in order to analyze a program, information is required which is related to a parent function, for example, CallStack information generated at any time or calling any function during program execution. However, no conventional trace program supports such a function. This is because performing a trace that calls all functions in a program would generate an excessive amount of information. Thus, it would be difficult to process and analyze such information effectively using conventional approaches.

Accordingly, the present invention is directed to a method of tracing or profiling any program using a relational database.

FIG. 3 is a block diagram showing an embodiment of a relational database data structure comprising a plurality of fields according to an aspect of the present invention.

Referring to FIG. 3, the relational database RDB data structure can include a plurality of fields, including activity ID 10, function ID 20, start time 30, continuation time 40, first child function activity ID 50, first sibling function activity ID 60, next activity ID 70, and parent function activity ID 80. Each of these fields is configured to store a value corresponding to the field name.

The activity ID 10 is a number indicating a position of a function in a list of program function, e.g., as ordered according to the start time of execution of each listed function. The function ID 20 is a value that identifies a function activated (or executed) in the program, e.g., each activated function can have a unique function ID 20. Thus, a function ID will be associated with an activity ID.

The start time 30 is a time value indicating when the function indicated by the activity ID 10 commences, and the continuation time 40 is a time value indicating a time difference between a start time of the function associated with the activity ID 10 and an end time thereof, i.e., it's a duration in time of the executed function. The first child function activity ID 50 indicates an activity ID 10 of a firstly called function of the function indicated by the current activity ID 10, which is referred to as a parent function relative to the child function. The first sibling function activity ID 60 is an activity ID 10 indicating another function that is called by the parent function immediately after the first child function. The next activity ID 70 indicates an activity ID 10 of a next execution of a function indicated by the current activity ID 10 after the current execution thereof. The parent function activity ID 80 indicates an activity ID 10 of a function that calls the function indicated by the current activity ID 10.

Herein, a parent function indicates a function that calls any function, a child function indicates a called function, and a sibling function indicates a function that is called from or by the same parent function.

The moment when a specific function is called from a different function, indicates that the specific function is activated. Therefore, the same function is capable of being repeatedly activated, so that it is possible to indicate each activity of the same function individually.

A relational database RDB is a database that is capable of expressing data in a table, and is structured for a user and a programmer to communicate with each other without limitation.

The relational database is a database using the relationship model, and applies the mathematic relationship concept. In case of a conventional CODASYL (COnference on DAta SYstem Language) database, there is used a pointer for correlating data mutually on the basis of one principle, which is that one record is processed at a time. On the other hand, the relational database is capable of freely accessing items in row and column directions without using the above-described pointer. Further, it is possible for a user to split and join a table freely and to add or change contents without affecting other items. Structural simplicity that enables smooth communications between the end-user and the programmer is an advantage of the relational database.

Figure 4A:
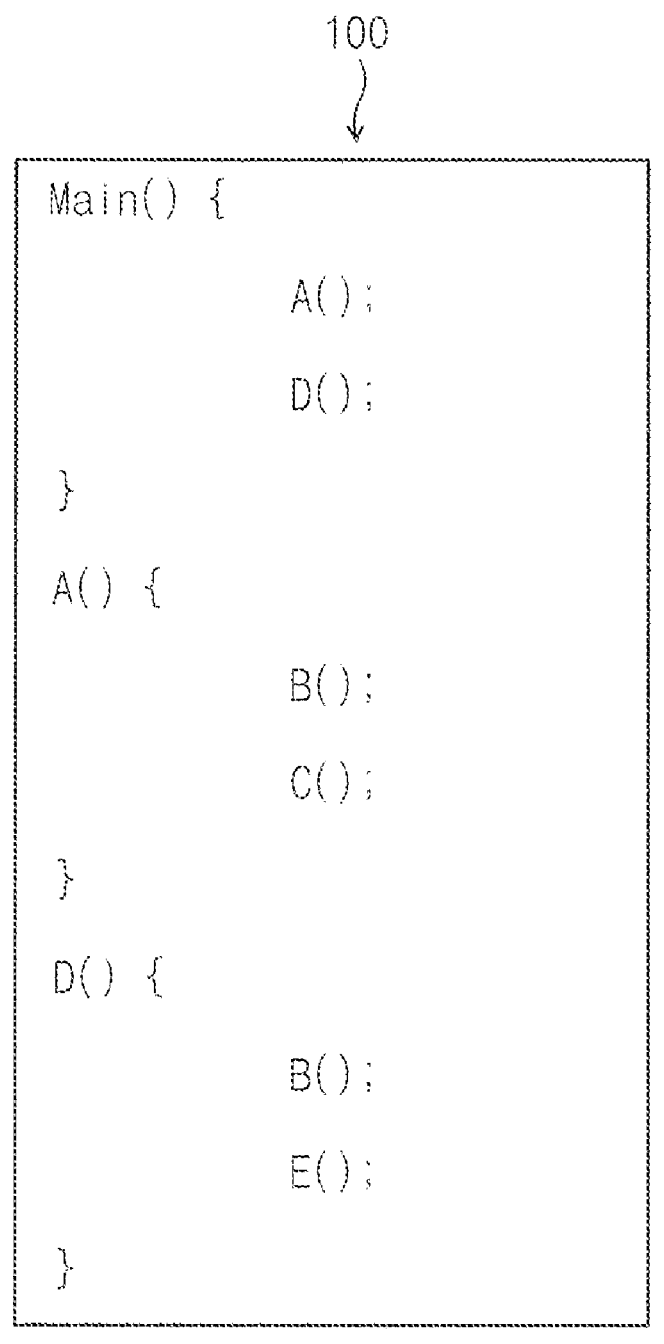
Figure 4B:
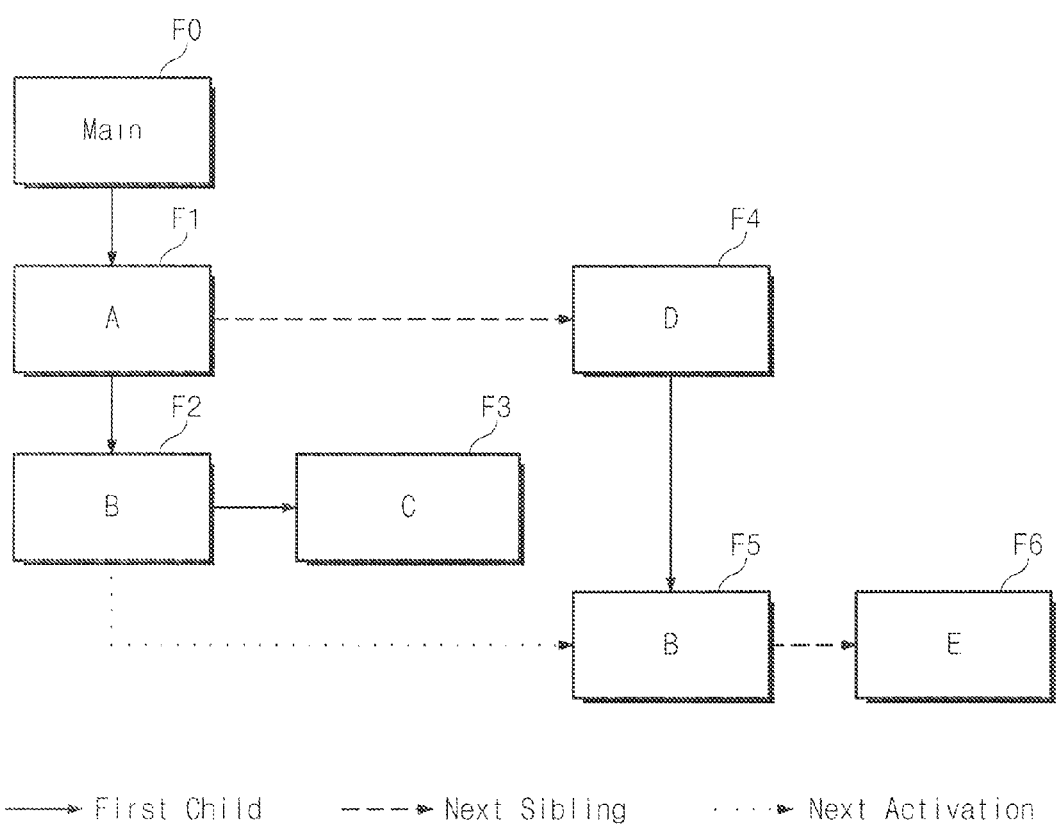
FIG. 4B is a block diagram showing the call relationship of functions in a program illustrated in FIG. 4A.
Figure 4D:
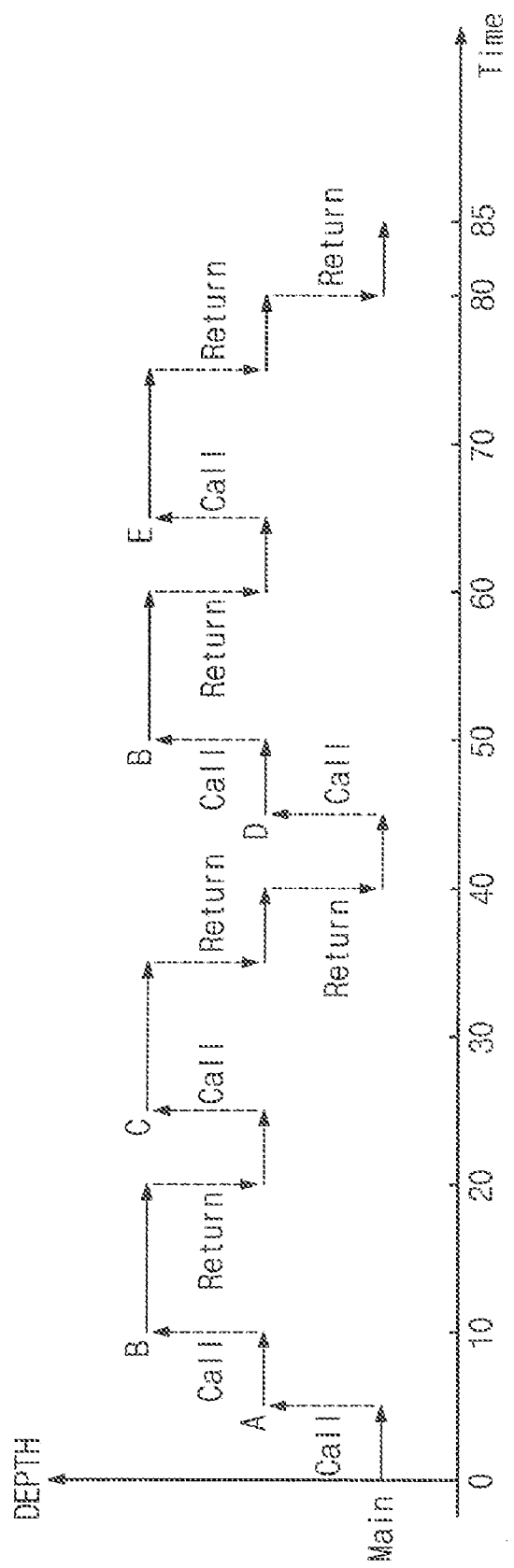
FIG. 4D is a timing diagram for describing the call relationship of functions according to the relational database.

FIG. 4A shows an exemplary program, and FIG. 4B is a block diagram showing the call relationship of functions in a program illustrated in FIG. 4A. FIG. 4C is an exemplary table showing the call relationship of the functions in FIG. 4B that are stored using the relational database, and FIG. 4D is a timing diagram for describing the call relationship of functions according to the relational database.

Referring to FIGS. 4A to 4D, an activity ID of a main function F0 is '1', an activity ID of an A function F1 is '2', an activity ID of a B function F2 is '3', an activity ID of a C function F3 is '4', an activity ID of a D function F4 is '5', an activity ID of a B function F5 is '6', and an activity ID of an E function F6 is '7'.

Referring to FIG. 4C, at time 0, a program 100 (see FIG. 4A) can execute the main function F0. The main function F0 starts at time 0 and is retained until time 85. At time 5, the main function F0 calls the A function F1. First child function activity ID of the main function F0 is '2'. That is, the A function F1 is the first child function of the main function F0, which is a parent function of the A function F1.

First child function activity ID of the A function F1 is '3'. That is, the B function F2 is a first child function of the A function F1. First sibling function activity ID of the A function F1 is '5'. In other words, a D function F4 is a first sibling function of the A function F1 (also see, for example, FIG. 4A).

At time 0, the A function F1 calls the B function F2, which commences at time 10 and has a continuation time of 10. First child function activity ID is '4'. That is, a C function F3 is a first sibling function of the B function F2. The A function F1 is a parent function of the B function F2.

At time 20, the B function F2 returns to the A function F1. At time 25, the A function F1 calls the C function F3. The C function F3 commences at time 25 and has a continuation time of 10. The A function F1 is a parent function of the C function F3.

At time 35, the C function F3 returns to the A function F1. At time 40, the A function F1 returns to the main function F0. At time 45, the main function F0 calls the D function F4. At time 50, the D function F4 calls the B function F5.

The B function F5 starts at time 50 and has a continuation time of 10. First sibling function activity ID of the B function F5 is '7'. That is, an E function F6 is a first sibling function of the B function F5. The D function F4 is a parent function of the B function F5.

At time 60, the B function F5 returns to the D function F4. At time 65, the D function F4 calls the E function F6, which starts at time 65 and has a continuation time of 10. The D function F4 is a parent function of the E function F6.

At time 75, the E function F6 returns to the D function F4. At time 80, the D function F4 returns to the main function F0. The program 100 is ended.

Activity ID 10 commences at time 0 with the first function, and numbers are assigned to the activity ID 10 sequentially with each subsequent function activation. When the next activity ID 70 is null, this means that the function indicated by function ID 20 corresponding to the activity ID 10 is not activated after the current activation. In a timing diagram of FIG. 4D, as an example, a horizontal axis indicates a time axis, and a vertical axis indicates depth. The depth indicates that calls and returns between functions are expressed vertically. That is, the depth is increased by '1' when any function is called and decreased by '1' when it returns.

Accordingly, it is possible to solve the program bottleneck by browsing a function call trace and a program path and by providing a parent function and CallStack information for a specific point in time.

Figure 5:
FIG. 5 is a diagram showing an embodiment of an output from a trace according to aspects of the present invention.

FIG. 5 is a diagram showing an embodiment of an output from a trace according to aspects of the present invention.

Referring to FIGS. 3 to 5, using a program trace method in accordance with aspects of the present invention, it is possible to browse a function call trace and to output function activity history information and history profiling information of a program path. A program path has a start and an end and comprises a set of functions that execute or activate therebetween.

In FIG. 5, a first column indicates a start time of an activated function, and a second column indicates an end time of an activated function. A third column indicates a continuation (or execution) time of an activated function, and a fourth column indicates child and parent functions of an activated function.

As understood from FIG. 5, in case of the present invention, it is possible to appoint or determine an activity ID 10 of a function 'HTaskRd'. The depth is assigned a value of '4' for an output of execution information for the function 'HTaskRd'.

The execution information of the function 'HTaskRd' can include the start and continuation times of the activity ID 10, the call and continuation times of all child functions called in the activity ID 10, and the like. Further, the execution information of the function can be generated for a depth of 4, and output recursively for the indicated depth.

In accordance with aspects of the present invention, it is possible to browse 'next activity', 'previous activity', 'activity of an Nth child function', 'activity of a parent function', 'activity of a function called after a function that a parent function shows', 'activity of a function called prior to a parent function', and the like, which are related to currently displayed activity ID.

Further, it is possible to output function activity history profiling information according to established conditions. For example, it is possible to establish limitations associated with an activity, such as limiting the trace to a specific time interval, an activity number range of a specific function, and activity in a specific program path.

Based upon established conditions, it is possible to output activity history information of a specific function (or its summarized information) in a table form and history profiling information of a program path.

Furthermore, it is possible to establish output conditions of a program path identically to function activity history profiling information. For example, it is possible to define a program path and to output activity history and summarized information of the program path.

The program path can be defined by a start function and an end function, and a specific function (a path function) can be selectively incorporated between the start and end functions.

Figure 6:
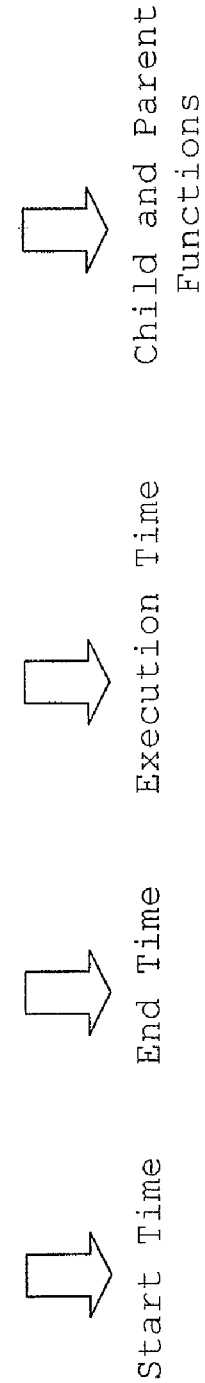
FIG. 6 is a diagram showing another embodiment of an output from a trace according to aspects of the present invention.

FIG. 6 is a diagram showing another embodiment of an output from a trace of a program path according to aspects of the present invention.

Referring to FIG. 6, the program trace method can browse a program path and provide CallStack information at a specific point in time. A first column indicates a start time of an activated function, and a second column indicates an end time of an activated function. A third column indicates a continuation (or execution) time of an activated function, and a fourth column indicates child and parent functions of an activated function.

Continuing to refer to FIG. 6, a program path is defined by a start function 'ATInt' and an end function 'ReadOpenHost'. It is possible to output the start function 'ATInt', the end function 'ReadOpenHost', and path functions between the start and end functions 'ATInt' and 'ReadOpenHost' by browsing a specific activation point in time '516' of the program path. Further, it is possible to recursively output the start function 'ATInt', the end function 'ReadOpenHost', and the start, end and continuation time of path functions between the start and end functions 'ATInt' and 'ReadOpenHost'.

The program trace method can provide information of a parent function. That is, the program trace method can enumerate all functions calling a specific function and output how often the specific function is called from each function, a total of execution time of each parent function, and the like.

The program trace method can output CallStack information at a specific activation point in time of a specific function or at a specific time, and the CallStack can include the call order of activated functions.

As set forth above, it is possible to improve program performance by browsing a function call trace and a program path and solving program bottlenecks using a parent function and CallStack information for a specific time.

In this embodiment, a descendant function can be used, which is a function that a child function calls, and an ancestor function can be used, which is a function that a parent function calls.

As will be appreciated by those skilled in the art, various embodiments of a program trace method in accordance with aspects of the present invention can be implemented or embodied in software, hardware, firmware, or a combination thereof. To the extent necessary, software implementing the program trace method can be stored in or on any form of known or hereafter developed memory or store media, and can be executed by one or more computer processors known in the art or hereafter developed. Those skilled in the art will readily appreciate that the program trace method is not inherently restricted to narrowly defined technical embodiments or implementations.

The above-disclosed subject matter is to be considered illustrative, and not restrictive, and the appended claims are intended to cover all modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of tracing a program, comprising:
providing a relational database data structure defining a plurality of fields configured to store program trace information, wherein the plurality of fields of the relational database data structure comprises an activity ID and a set of information related to the activity ID including a function ID, a start time, a continuation time, a first child function activity ID, a first sibling function activity ID, a next activity ID, and a parent function activity ID;
executing a program comprising a plurality of functions including calling a function from the program;
extracting first trace data of the function and storing the first trace data in a portion of the plurality of fields;
after executing the program, extracting second trace data associated with the first trace data and storing the second trace data in remaining portions of the plurality of fields;
designating the called function in the activity ID; and
outputting start, end, and continuation times associated with the activity ID and start, end and continuation times of a child function that the function indicated by the activity ID calls.

2. The method of claim 1, wherein the first trace data comprises a name, a start time, and an end time associated with the called function.

3. The method of claim 1, wherein the second trace data comprises the first sibling function activity ID and the next activity ID.

4. The method of claim 1, wherein the remaining portions of the plurality of fields comprises the first sibling function activity ID and the next activity ID.

5. The method of claim 1, further comprising:
recursively displaying information of child functions associated with the activity ID up to a predetermined depth.

6. The method of claim 5, wherein the predetermined depth indicates calls and returns between the called function and child functions.

7. The method of claim 1, further comprising tracing activity of the called function as a function to be browsed using one or more of:

a previous activity of the function to be browsed,
a next activity of the function to be browsed,
an activity of a parent function of the function to be browsed,
an activity of an Nth child function of the function to be browsed,
an activity of the function to be browsed that a parent function of the function to be browsed calls prior to the function, and
an activity of the function to be browsed that a parent function of the function to be browsed calls next after the function.

8. The method of claim 1, further comprising:
establishing at least one program path trace parameter including:
an activity number range of a specific function, and
a specific time interval; and
outputting activation start, end and continuation times of a program path according to the at least one program path trace parameter.

9. The method of claim 1, further comprising:
outputting a call number and an execution time of each parent function associated with the activity ID.

10. The method of claim 1, further comprising:
designating a time and an activity ID for generating a CallStack; and
outputting the CallStack.

11. The method of claim 10, wherein the CallStack is a call order of the activity ID.

12. A method of tracing a program, comprising:
providing a relational database data structure defining a plurality of fields configured to store program trace information, wherein the plurality of fields of the relational database data structure comprises an activity ID and a set of information related to the activity ID including a function ID, a start time, a continuation time, a first child function activity ID, a first sibling function activity ID, a next activity ID, and a parent function activity ID;
executing a program comprising a plurality of functions including calling a function from the program;
extracting first trace data of the function and storing the first trace data in a portion of the plurality of fields;
after executing the program, extracting second trace data associated with the first trace data and storing the second trace data in remaining portions of the plurality of fields;
designating a program path by providing at least one of a start function ID and an end function ID of the program path, a function ID that the program path passes, and a function ID that no program path passes; and
displaying a start time, an end time, and a continuation time of function IDs corresponding to the program path.

13. The method of claim 12, wherein the program path comprises path functions between the start function and the end function indicated by the start function ID and the end function ID, respectively.

14. The method of claim 13, wherein the path functions comprise a first function called by the start function, a (N−1)th function called by the first function, and an Nth function called from the (N−1)th function.

15. The method of claim 12, further comprising:
recursively displaying functions corresponding to the program path up to a predetermined depth.

16. The method of claim 15, wherein the predetermined depth indicates calls and returns between the functions.

17. The method of claim 12, further comprising:
providing at least one of a previous activity and a next activity of the program path to trace activity of the program path.

18. A method of tracing a program, comprising:
providing a relational database data structure defining a plurality of fields configured to store program trace information, wherein the plurality of fields of the relational database data structure comprises an activity ID and a set of information related to the activity ID including a function ID, a start time, a continuation time, a first child function activity ID, a first sibling function activity ID, a next activity ID, and a parent function activity ID;
executing a program comprising a plurality of functions including calling a function from the program;
extracting first trace data of the function and storing the first trace data in a portion of the plurality of fields;
after executing the program, extracting second trace data associated with the first trace data and storing the second trace data in remaining portions of the plurality of fields;
establishing at least one trace parameter corresponding to at least one of:
an activation number range of the activity ID,
a time range of the activity ID,
an activity included in a program path,
an activity having a specific function as a descendant function, and
an activity having a specific function as an ancestor function;
designating the called function in the activity ID; and
outputting activation start, end and continuation times of the activity ID and activation history information of a parent function of the activity ID based on the established at least one trace parameter,
wherein the descendant function is a function that a child function calls and the ancestor function is a function that a parent function calls.

* * * * *